Aug. 10, 1926.
P. W. PRUTZMAN
MULTIPLE CHAMBER FILTER PRESS
Filed March 29, 1922
1,595,616
2 Sheets-Sheet 2
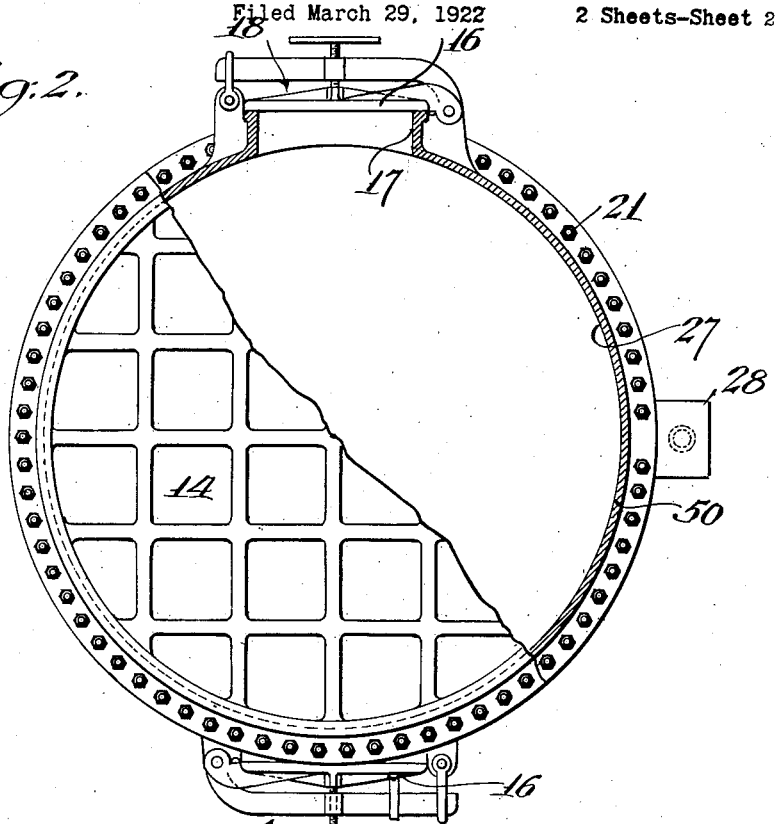
Fig. 2.
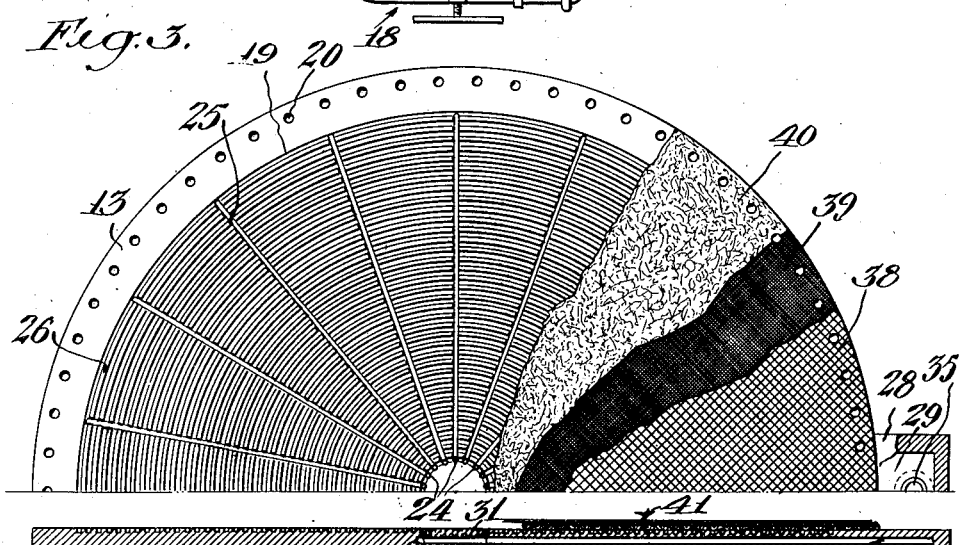
Fig. 3.
Fig. 4.
Inventor
Paul W. Prutzman
by Graham + Harris
Attorneys.

Patented Aug. 10, 1926.

1,595,616

UNITED STATES PATENT OFFICE.

PAUL W. PRUTZMAN, OF LOS ANGELES, CALIFORNIA, ASSIGNOR TO GENERAL PETROLEUM CORPORATION, A CORPORATION OF CALIFORNIA.

MULTIPLE-CHAMBER FILTER PRESS.

Application filed March 29, 1922. Serial No. 547,668.

This invention relates to the refining of petroleum and other oils, and relates particularly to filter presses used for the mechanical separation of solids from liquids, to the washing and drying of such separated solids, and to processes wherein liquids are passed through powdered absorbent material for the removal of impurities contained in such liquids.

It is the object of my invention to provide a filter press which may be used to remove from oils those suspended powdered substances, such as absorbent materials, which are mixed with the oil for the purification or decolorization thereof.

It is a further object of my invention to provide a filter press in which absorbent materials may be placed and the oil to be treated passed therethrough under pressure of air or of nonreactive gases.

It is a further object of my invention to provide an apparatus of this type in which the filter cake deposited upon the filter screen may be washed with petroleum spirits or other solvents without such cake being removed from the press.

It is a further object of my invention to provide an apparatus of this type in which such washing of the press cake may be conducted with a minimum loss of the solvent employed for washing.

It is a further object of my invention to provide such an apparatus in which the filter cake may be washed and dried in the press and thereafter removed therefrom as a dry powder, in a condition in which it is readily and easily handled, and without dismounting the press or separating the respective parts thereof.

Other objects and advantages will be made evident hereinafter.

Referring to the drawing, which is for illustrative purposes only,

Fig. 2 is a plan view of the device shown in Fig. 1, a portion of the top chamber member thereof being sectioned.

Fig. 3 is a partial plan view of one of the partition plates I employ, showing the filter screens in place thereupon.

Fig. 4 is a cross diametral section of one of the partition plates.

Figure 1:
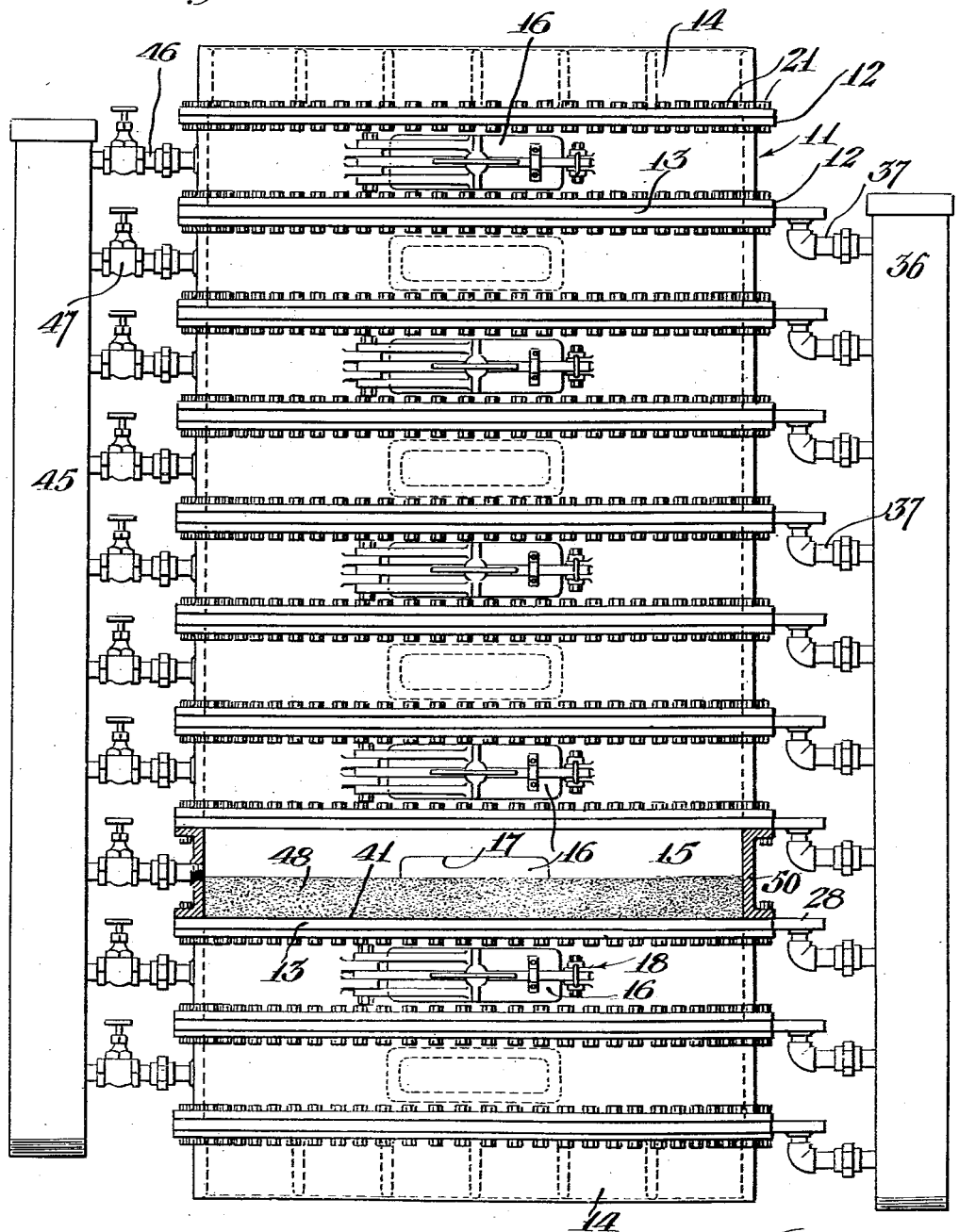
Fig. 1 is an elevational view of an apparatus embodying the features of my invention, one of the chamber sections thereof being sectioned to illustrate the distribution of the absorbent materials therein in the form of a filter cake.

Animal and vegetable oils, petroleum distillates and the like are often unfit for use either in the crude condition or after partial refining with chemicals, and it is customary to treat such oils with powdered absorbent substances such as bone, charcoal, clay or fuller's earth which are intermixed with the oil in cold or heated condition, as the instance may require, to remove certain impurities or coloring matters contained therein; also such oils are often treated with solid alkalis to neutralize and cause the solidification of acids contained therein, and, in cases where quantities of finely divided paraffin are contained in the oil, filter aids may be employed which are also in powdered form.

These powdered substances must be entirely removed before the oils can be put into commercial use, so it is common practice to employ filter presses in which the oil is forced through fine metallic or fabric screens either by mechanical or fluid pressure, the solid materials being retained upon the filter screens.

The solid materials composing the filter cake always retain an important and valuable part of the oil with which they were originally mixed, not merely as impurities but also as purified oil mechanically entrained. Also the solids composing the body of the cake are often of value, for recovery and re-use or for other purposes, but this only after the separation of such entrained oil, and it is therefore customary to remove such cake from the filter press and to submit it, in other apparatus, to such washing and drying operations as will separate and recover the oil contained therein and will reduce the cake to a dry powder.

It is the object of my invention to provide a single piece of apparatus in which all these operations, to-wit, filtering, washing the cake free from adhering oil, and drying out the adhering solvent, may be conducted with the least possible labor and with the least possible loss of valuable solvent, and further, to provide an apparatus in which a valuable yield of purified oil may be obtained from the filter cake by simply blowing therethrough air or other gas under pressure.

My invention is of the fluid actuated classification of filter presses and consists, as shown in the drawing, of a plurality of tubular sections 11 provided with flanges 12 and consecutively joined together with partition plates 13 situated therebetween, and having reinforced top and bottom members 14, as shown in Fig. 1 in the drawing, to form a battery of separate compartments or consecutive chambers 15 in "parallel" arrangment relatively to headers hereinafter mentioned. Each of the sections 11 is provided with a door 16 adapted to seal an opening 17 and provided with suitable supporting and locking means, as shown at 18.

The partition plates 13 are provided with holes 20 through which bolts 21 are extended to secure the sections 11 and the intervening plates 13 in operating position. This method of locking the sections together is not an essential element of my invention, as the tubular sections 11 and the plates 13 may also be locked together by joining the heads together by means of side rods or other members in tension, and applying pressure by means of screws, hydraulic ram or other well known means.

Upon the upper surface 19 of the partition plate 13 may be formed radial grooves 25 extending from a central position to a point coincident with the inner face 27 of the members 11 and the concentric circular channels 26 are in this case formed in communication with the channels 25. The use of the radial grooves 25 and the circular channels 26 is not an essential element of this invention, though it is desirable where very viscous oil is to be filtered. With lighter oil a plain surfaced plate will answer the same purpose.

A projection 28 extended radially outward from each of the plates 13 is provided with a passage 29 which extends within the plate 13 to a point 30 slightly beyond the center thereof. Each of the channels 25 is connected to the passage 29 by holes 24 drilled vertically through the upper wall 31 enclosing the passage 29. A downwardly directed opening 35 is provided in each of the projections 28 through which communication is obtained between the passages 29 and the header 36 through piping connections 37.

Upon the surface 19 and the plate 13 I mount suitable filtering materials consisting usually of a bottom layer of coarse screen 38 over which is placed a fine screen 39 surmounted by a layer of filter cloth 40. In many cases one or both of the screens may be omitted and the filter cloth may in some cases be replaced by a finely woven metallic cloth. The screens, if used, should be cut to circles slightly smaller than the inside diameter of the member 11, and the extreme outer edge of such screens should be filled with solder or otherwise protected so as not to cut through the cloth. The cloths should be cut in circles slightly smaller than the diameter of a circle laid inside the bolt holes 20. When the cloths are laid over the screens the flanges 12 of the members 11 are clamped down thereagainst to firmly hold these filter materials securely in place.

The oils to be filtered are delivered through a header 45 and are directed almost simultaneously into each of the compartments 15 through piping connections 46 in which are located valves 47, and, in such instances where the oil contains absorbent materials to be removed, a filter cake, such as indicated at 48 in Fig. 1, forms upon the filter cloth 41, the oil passing through the consecutive layers of filtering material into the channels 26 and the channels 25, the oil collected in the channels 26 flowing into the channels 25 and passing inwardly therethrough to the holes 24 connected with the passage 29, from whence the filtered oil is carried to the header 36 through the piping connections 37.

In certain of the treatments of oil, it is customary to pass the oil through a layer of absorbent materials which take up certain of the impurities of the oil as it passes therethrough. In such operations the materials, such as indicated at 48, are placed within the chambers 15 through the openings 17, and the oil is afterwards circulated therethrough under pressure as before described.

After the oil has been passed through the filter screen, and when a sufficient thickness of filter cake has collected, a flow of air under sufficient pressure is passed through the filter cake to remove as much as possible of the oil adhering thereto, the oil so obtained being of the first quality, and such as may be mixed with the oil obtained in the filtration just described.

The blowing having been continued until no further profitable yield of oil is obtained, the cake 48 may be washed by circulating a flow of gasoline or other solvent therethrough to wash out the remainder of the oil not extracted from the cake by blowing. This wash may be followed by another wash with a solvent suitable to remove the impurities absorbed by the absorbent material, or a single solvent may be used which will be suitable to remove both adhering oil and absorbed impurities. In either case washing is continued until no further valuable yield is obtained by action of the solvent.

The flow of gasoline having been discontinued, the solid matter of the cake may then be dried by passing a blast of hot or cold air therethrough, which operation is continued until the solvent is entirely removed. It is then possible to remove the filter cake 48 by opening the doors 16 and blowing the powdered materials forming the filter cake through the opening 17 by a blast of compressed air, or it may be desirable to remove these materials by scoops or other suitable implements. In either case it is not necessary to disassemble or separate the component parts of the press, as the emptying operation may be conducted through the doors 17 only.

Although I have shown a type of plate 13 with channels formed only upon the upper surface thereof, it is sometimes desirable to provide these with channels upon both the upper and lower surfaces of the plates and to cover both these surfaces with filter cloth so that the oils being filtered may be carried off with greater expedition as the capacity of such an apparatus is approximately twice that of the type illustrated. This modification is less desirable if the cake is to be washed, as the upper cake tends to become detached from the cloth and prevent thorough and complete washing. In any case, the plates 13 are intended to be imperforate in the sense that no fluid can pass therethrough from one chamber to an adjacent chamber.

In the drawing, Fig. 1, the assembled press is shown standing in a vertical position, so that the plane of the plates 13 is horizontal. It should be clearly understood that this horizontal position of the plates is an essential feature of my invention, and that the press will not function properly if the plates are disposed in any other position than horizontal or at least approximately level.

I claim as my invention:

1. In a filter press, the combination of: a hollow body; imperforate horizontally disposed partitions having channels formed therein said partitions dividing said hollow body into chambers which have no direct communicating passages therebetween; filter screens upon said partitions; separate inlets introducing a liquid substance to be filtered into each of said chambers; said inlets permitting a transmission of high pressure to said substance to force the liquid elements thereof through said filter screens; means for separately controlling the supply of fluid to each of said chambers; and means connecting with said channels for carrying off said liquid elements; a lateral clean-out opening in a vertical side of each chamber; and separate means for the tight closure of each opening.

2. In a filter press, the combination of: a hollow body; imperforate partitions having channels formed therein dividing said hollow body into chambers which have no direct communicating passages therebetween; filter screens upon said partitions; means for introducing a liquid substance to be filtered into each of said chambers; and permitting a transmission of high pressure to said substance to force the liquid elements thereof through said filter screens; means for separately controlling the supply of fluid to each of said chambers; means connecting with said channels for carrying off said liquid elements; and separate access means into each of said chambers through which materials deposited upon any one of said screens may be separately removed therefrom during the continued flow of said liquid through others of said chambers.

3. In a filter press, the combination of: a hollow body comprising a number of tubular members axially disposed in consecutive arrangement; imperforate plate members separating and closing off said tubular members into compartments, certain of said plate members being provided with channels in the body thereof; inlet means for simultaneously introducing liquids into said compartments; filter screens upon the surfaces of said channeled plates; and permitting a transmission of high pressure to force said liquid through said filter screens; means for separately controlling the supply of fluid to each of said chambers; means connecting with said channels for carrying off said liquids therefrom; and covered separate means providing access into said compartments individually for the removal of materials deposited upon said screens, without disassembly.

4. In a filter press, the combination of: a hollow body comprising a number of tubular members axially disposed in consecutive arrangement; imperforate and substantially horizontal plate members separating and closing off said tubular members into separate compartments, certain of said plate members being provided with interconnected surface channels; filter screens upon the surface of said channeled plates; inlet means for simultaneously introducing liquids into said compartments; and permitting a transmission of high pressure to force said liquids through said screens; means for separately controlling the supply of fluid to each of said chambers; and means connecting with said channels for carrying off said liquids therefrom, and separate means providing access into each of said compartments for the removal of materials deposited upon said screens, said means comprising lateral doors through which dry residues may be blown 5. In a filter press, the combination of separate flanged tubular members consecutively arranged and permanently assembled, and an imperforate filter supporting plate having a corrugated filter-supporting surface interposed between the flanged tubular members.

6. In a filter press, a pressure chamber, an imperforate filter supporting plate having a corrugated filter-supporting surface in said chamber, and a removable cover for a means of access into said chamber for the lateral removal of solids without disassembling.

In testimony whereof, I have hereunto set my hand at Los Angeles, California, this 23rd day of March, 1922.

PAUL W. PRUTZMAN.